(12) United States Patent
Mishra et al.

(10) Patent No.: US 9,475,198 B2
(45) Date of Patent: Oct. 25, 2016

(54) SYSTEM AND METHOD FOR DYNAMIC ROBOT MANIPULATOR SELECTION

(71) Applicant: QUALCOMM Incorporated, San Diego, CA (US)

(72) Inventors: Lalan Jee Mishra, San Diego, CA (US); Jose Gilberto Corleto, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/579,942

(22) Filed: Dec. 22, 2014

(65) Prior Publication Data

US 2016/0176043 A1     Jun. 23, 2016

(51) Int. Cl.
  *G05B 15/00* (2006.01)
  *B25J 15/04* (2006.01)
  *B25J 9/16* (2006.01)

(52) U.S. Cl.
  CPC ............ *B25J 15/0466* (2013.01); *B25J 9/1602* (2013.01); *B25J 15/0483* (2013.01); *G05B 2219/39468* (2013.01); *G05B 2219/40302* (2013.01); *Y10S 901/02* (2013.01); *Y10S 901/09* (2013.01)

(58) Field of Classification Search
  CPC ...... B25J 9/0084; B25J 9/1674; B25J 13/00; Y10S 901/023; Y10S 901/09
  USPC ........................................................ 700/260
  See application file for complete search history.

(56) References Cited

U.S. PATENT DOCUMENTS

| | | |
|---|---|---|
| 4,488,241 A | 12/1984 | Hutchins et al. |
| 4,543,032 A | 9/1985 | Leverett et al. |
| 4,611,377 A | 9/1986 | McCormick et al. |
| 5,256,128 A | 10/1993 | Neumann |
| 7,252,512 B2 * | 8/2007 | Tai .................. H01R 13/6205 439/39 |
| 7,637,747 B2 * | 12/2009 | Jaatinen .............. A61B 5/0408 439/39 |
| 9,085,080 B2 * | 7/2015 | Mian ....................... B25J 9/16 |
| 2005/0251110 A1 * | 11/2005 | Nixon ..................... B25J 9/1692 606/1 |
| 2010/0228264 A1 * | 9/2010 | Robinson ........... A61B 18/1206 606/130 |
| 2014/0163730 A1 * | 6/2014 | Mian ....................... B25J 9/16 700/248 |
| 2014/0373662 A1 * | 12/2014 | Umeno ............... B25J 15/0052 74/490.01 |
| 2015/0025549 A1 * | 1/2015 | Kilroy ................... A61B 90/60 606/130 |
| 2015/0150634 A1 * | 6/2015 | Isoda ..................... A61B 17/29 606/130 |

(Continued)

FOREIGN PATENT DOCUMENTS

DE   102013010463 A1   3/2014
JP       H11114857 A   4/1999

OTHER PUBLICATIONS

Athawale V.M., et al., "A comparative study on the ranking performance of some multi-criteria decision-making methods for industrial robot selection," International Journal of Industrial Engineering Computations, vol. 2, 2011, pp. 831-850.

Bhangale P.P., et al., "Attribute based specification, comparison and selection of a robot," Mechanism and Machine Theory, 2004, vol. 39, pp. 1345-1366.

(Continued)

*Primary Examiner* — Ian Jen
(74) *Attorney, Agent, or Firm* — Smith Tempel Blaha LLC

(57) ABSTRACT

A robotic system includes a set of manipulators selectively and operatively coupled via a common interconnect to a control module. The control module is responsive to parameters recorded while performing a defined task with members selected from the set of manipulators. The parameters are applied to a selection engine that identifies an optimal member from the set of manipulators for a defined task.

28 Claims, 9 Drawing Sheets

(56) References Cited

U.S. PATENT DOCUMENTS

| | | | | |
|---|---|---|---|---|
| 2015/0151431 A1* | 6/2015 | Suyama | ............... | B25J 9/1671 700/264 |
| 2015/0157411 A1* | 6/2015 | Choi | ............... | A61B 19/2203 606/130 |
| 2015/0158181 A1* | 6/2015 | Kawamura | ............ | B25J 9/1697 700/259 |

OTHER PUBLICATIONS

Kawasaki H., et al., "Adaptive Coordinated Control of Multiple Robot Arms," Proceedings of the 6th IFAC Symposium, Robot Control, 2000, 6 pages.

Liu Y.H., et al., "Cooperation Control of Multiple Manipulators with Passive Joints," IEEE Transactions on Robotics and Automation, Apr. 1999, vol. 15 (2), pp. 258-267.

Zhang J., et al., "Rapid On-Line Learning of Compliant Motion for Two-Arm Coordination," In Proceedings of the IEEE International Conference on Robotics and Automation, 1998, 6 pages.

Cakraborty S., "Applications of the MOORA Method for Decision Making in Manufacturing Environment," International Journal of Advanced Manufacturing Technology, Oct. 13, 2010, vol. 54 (9-12), pp. 1155-1166, XP019903425, ISSN: 1433-3015, DOI: 10.1007/S00170-010-2972-0, Abstract table 1, Section 3.1.

International Search Report and Written Opinion—PCT/US2015/059408—ISA/EPO—Feb. 4, 2016.

* cited by examiner

SYSTEM AND METHOD FOR DYNAMIC ROBOT MANIPULATOR SELECTION

BACKGROUND

1. Technical Field

The present disclosure relates generally to robotics, and more specifically to robotic manipulator selection.

2. Related Art

In the design of robots that are intended by their designers to perform tasks or operations of the type usually done by people, it is problematic to provide an artificial hand which can grasp, hold, maneuver or otherwise manipulate the many shapes, sizes, weights, and densities of objects that are readily manipulated by the human hand. An example of this problem can be observed in chemical laboratories where such diverse tasks as removing and replacing caps on jars, grasping, lifting, operating syringes, handling, or transferring contents from many different sizes and styles of beakers, test tubes or other containers, may each require a set of particular hand actions that are difficult to achieve with an electro-mechanical assembly.

In the past it has been the practice of engineers and designers to place a great deal of emphasis on the design of mechanisms that can do as many of the functions that might be to be required of a particular robot in a particular installation. This design approach adds complexity and significant expense as any particular assembly is unlikely to be suitable for a wide-range of desired tasks.

As a result of the problems and expense of attempting to create individual mechanisms that can perform a wide-range of tasks, some designers have developed interchangeable tools. In one example, U.S. Pat. No. 4,488,241 introduces and describes a system with interchangeable robotic hands that can receive feedback from each hand.

In another example, U.S. Pat. No. 4,543,032 introduces and describes interchangeable tools for a gripper of an object manipulator. The retention technique uses a self-releasing detent supplemented by frictional forces produced by the gripper to enable a fast and efficient reconfiguration of the finger tools.

In a further example, U.S. Pat. No. 4,611,377 introduces and describes a system with interchangeable end-of-arm tools for performing multiple tasks. The system includes a quick change adapter.

U.S. Pat. No. 5,256,128 introduces and describes a gripper exchange mechanism for small robots. A bi-stable latch is provided which minimizes the force required to latch and unlatch the end effectors, thereby providing an end effector exchange mechanism useful for small robots capable of producing relatively small operating forces.

Despite the introduction and development of robotic systems with interchangeable tools and mechanisms, further improvements and cost reductions are desired to accelerate the deployment and marketability of automated electro-mechanical devices to consumers.

SUMMARY

A robotic system and a method for selecting a manipulator from a set of available manipulators for completing a defined task are illustrated and described in exemplary embodiments.

An example robotic system includes a set of manipulators, an interconnect, an arm and a control module. The interconnect includes a first port and a manipulator port. The interconnect is arranged to enable a selective coupling of a member from the set of manipulators to the manipulator port. The arm is arranged with a control port and an opposed port. The control port couples the arm to the control module. The opposed port couples the arm to the first port of the interconnect. The control module includes a selector engine that is responsive to parameters recorded while performing one or more attempts to complete a defined task with at least two members from the set of manipulators.

An example method for selecting a manipulator includes the steps of providing a set of manipulators, arranging an interconnect with a first port and a manipulator port to operatively couple members from the set of manipulators to a control module via the manipulator port and enabling a selective coupling of a member from the set of manipulators to the manipulator port, the selective coupling responsive to recorded results from respective attempts to complete a defined task using the member from the set of manipulators when coupled to a control system.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
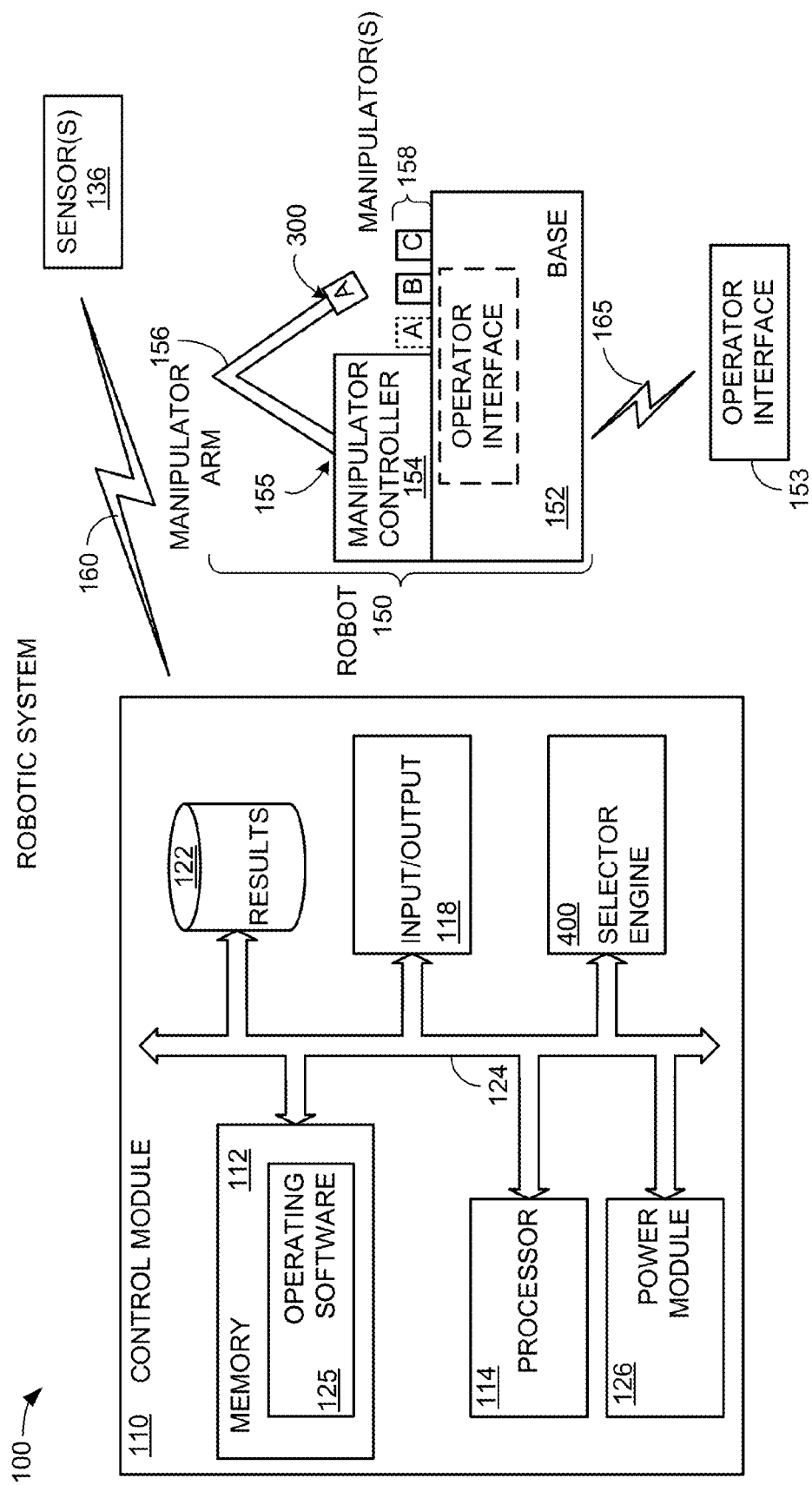
FIG. 1 is a schematic diagram illustrating an example embodiment of a robotic system and a control module of the robotic system.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

The term "robot" includes an electro-mechanical machine capable of manipulating one or more physical entities in a desired way in accordance with programmed instructions enabled through electronic circuitry.

An improved electro-mechanical machine or robotic system is arranged with an electrical and mechanical framework that supports selective deployment of a manipulator selected from a set of available manipulators. Task completion is optimized by enabling dynamic selection of a particular manipulator from the set of available manipulators based on a defined task. The robotic system is responsive to parameters recorded during one or more attempts to perform the defined task using two or more members from the set of available manipulators. In an embodiment, a selection or decision matrix is used to identify a manipulator from the set of available manipulators that provides an optimal task completion result based on one or more of energy consumption, elapsed time and quality of task completion.

Under certain circumstances, a measure of the quality of task completion is used to adjust or weight a selection criteria that results from one or more instances of attempts to complete the defined task. An adjusted selection criterion is applied algorithmically to identify a manipulator. The robotic system is further optimized by considering the manufacturing costs associated with each of the members from the set of available manipulators together with the measured quality of the task performed.

Under different circumstances, such as in response to receipt of an input directing the robotic system to select a manipulator based on the elapsed time to complete a defined task, the robotic system overrides an energy consumption based selection of a manipulator. In other situations, quality of the task performed may be an overriding condition despite the energy consumed and the elapsed time required to complete a defined task.

In an exemplary embodiment, the robotic system includes a network interface. The network interface enables similarly configured robotic systems to share results. Results may be stored in one or more network-accessible storage locations exposed to similarly arranged robotic systems. In a roll-out or test phase where new or previously untested manipulators are added to a set of manipulators, results may be collected from one or more similarly arranged robotic systems. The collection process may include a distributed schedule for establishing respective communication sessions with the robotic systems.

Such communication sessions may include two-way data transfers where local results are uploaded to the storage location(s) and results from similarly arranged robotic systems are shared. The communication sessions may be established between a server programmed to collect and distribute results with each individual robotic system, in response to a request issued by the server (e.g., in accordance with a schedule) or such communication sessions may be established once a robotic system has collected data. Individual robotic systems may be programmed to initiate a communication session on a schedule, upon the completion of a designated number of test runs, when the data collected and stored locally reaches a specified storage volume, or based on other factors.

However or whenever collected, the results can be used to generate instructions that predefine a select manipulator from a set of available manipulators to perform a defined task with similarly arranged robotic systems. Alternatively, in a self-learning mode, each individual robotic system can be programmed to identify a select manipulator for performing a desired task based on local results.

In another exemplary embodiment, the robotic system is arranged with a local interface to receive one or more inputs from an operator. Such controls may be used by an operator to override a pre-defined select manipulator for a defined task or to override a manipulator selection based on local results, as may be desired. For example, once sufficient data is collected either from the collective environment of similarly arranged robotic systems or locally to distinguish one member of the set of manipulators as better suited to perform a particular task than another member of the set of manipulators, the robotic system may be programmed to select the better suited manipulator as a default position. When this is the case, the described local interface may be used by an operator to override the default selection to collect additional data or for other reasons.

According to a further exemplary embodiment of a robotic system, the control module is responsive to a selector engine that is responsive to measurements related to power used and time expended in performing a task. In particular, the control module may further record a measure of success. A measure of success can include binary results (e.g., task completed/task not completed) as well as a qualitative score as determined and provided by an observer. A qualitative score or measure of success may include a scale representing a task that was completed with some faults but still acceptable on one end of the scale to a task that was completed in a faultless manner on the opposite end of the scale. More particularly, the control module further determines an optimal manipulator from a set of manipulators by determining a result from a function of one or more of power and time. In some arrangements, the robotic system may be programmed or constructed to determine an optimal manipulator as a weighted function of power or time with the qualitative measure of success providing a weight factor.

An exemplary control module includes a processor, a memory, and a power supply. Each of the processor, memory and power supply are coupled to one another via a bus with connections and elements suitable for distributing power, communicating data, and controlling the data transfers. The memory may include a set of programmed instructions that when executed by the processor enable the described data communication sessions, operator controls, and robotic functions. Alternatively, the robotic system may be implemented in an application specific integrated circuit or in a system of analog or digital integrated circuits including appropriate registers, buffers, inverters, logic circuits, etc. to enable the described functions.

A memory or data store may be entirely local to the robotic system or portions thereof may be distributed across network-coupled devices. A data structure or table stored locally or in a network-coupled device is arranged to record a task attempt history to be used in subsequent manipulator selection decisions. In this regard, the table may include a measure of power required to complete a task, an elapsed time to complete a task, a binary indicator of whether a task attempt was completed successfully, manipulator identifiers, control module identifiers, etc. The table may further include a qualitative measure of task success. In some arrangements, a pre-defined manipulator is identified for a defined task. These arrangements may or may not include the historical data that was used to make the determination of the best-suited manipulator from the set of available manipulators to perform the identified task.

Example arrangements, as illustrated in the drawings, are further described. In this regard, FIG. 1 is a schematic diagram illustrating an example embodiment of a robotic system 100 including a control module 110, robot 150 and one or more sensors 136. The robotic system 100 and control module 110 provide a framework and an environment that enable dynamic manipulator selection when a set of manipulators 158 is available for selection and operative coupling to the robot 150. The robot 150 includes a base or base module 152, a manipulator controller 154, manipulator arm 156 and a set of manipulators 158, a member of which is shown operatively coupled to the manipulator arm 156. In the illustrated arrangement, the robot 150 has three exemplary manipulators designated as manipulator A, manipulator B and manipulator C. In an exemplary embodiment, manipulator A is coupled to the manipulator arm 156 and accordingly is shown in phantom (i.e., with broken lines) on the base 152.

The base or base module 152 includes a power supply or a power supply interface (not shown). In some arrangements, the power supply may include one or more batteries and regulators for providing direct current (DC) power to one or both of the manipulator controller 154 and the control module 110. In still other arrangements, the power supply may include an alternating current (AC) line cord coupled to an AC power distribution system and an AC-DC converter (which will generally include a transformer, rectifier and a regulator for providing power to the robot 110 (not shown) and or recharging one or more rechargeable batteries. One having ordinary skill in the art will understand the construction and operation of DC battery powered, AC powered and AC-DC powered or rechargeable power supplies, and, as such, implementation details are omitted for brevity. In some arrangements, the base or base module 152 is arranged with one or more drive mechanisms and one or more sensors that enable the robot 150 to controllably move along a surface.

The manipulator controller 154 provides the mechanical, power and signaling interfaces between the base 152 and the manipulator arm 156. The manipulator controller 154 may include one or more motors, gears, threaded rods, drives, pulleys, sensors, amplifiers, processors, etc. arranged to maneuver the manipulator arm 156 and the coupled manipulator 158. The manipulator arm 156 and or the base 152 may further include a memory with programs, content, and instruction stores for performing tasks. In operation, instructions from the one or more instruction stores are communicated to the processor which generates various control signals that enable the robot 150 and more particularly the manipulator arm 156 to controllably move the arm to perform various tasks when a select member of the set of manipulators 158 is coupled to the manipulator arm 156. In this regard, the manipulator controller 154 may function in accordance with a program or programs stored in the robot 150 or communicated to the robot 150 as may be desired.

In the illustrated embodiment, the manipulator arm 156 includes a first member proximal to the base 152 and the manipulator controller 154 and a remote member proximal to the manipulator A. An elbow connects the first member and the remote member. The manipulator arm 156 is not so limited and may include additional joints and other mechanisms that enable one or more of extension and rotation of the remote member or intervening members as may be desired. However arranged, the manipulator arm 156 includes a control port 155 coupled to the manipulator controller 154 and an interconnect 300 coupled to a member selected from the set of available manipulators 158 at an opposed end of the manipulator arm 156. Features of the interconnect 300 are illustrated and described in association of with FIG. 3. Similar or dissimilar features to those in the interconnect 300 may be arranged to enable the mechanical and electrical coupling at the control port 155. One having ordinary skill in the art will understand the construction and operation of a robotic system 100, and, as such, implementation details are omitted for brevity.

In an exemplary embodiment, the control module 110 comprises a memory 112, a processor 114, a selector engine 400, an input/output interface 118, a results store 122 and a power module 126 operatively coupled together over a system bus 124. The system bus 124 can comprise physical and logical connections that couple the above-described elements together and enable their interoperability. In an embodiment, the control module 110 can be partly or wholly implemented on a computing device, such as a personal computer, tablet, or other computing device remote from but in communication with the robot 150. In these remote arrangements a communication link couples the control module 110 to the robot 150. Such communication links may be wired or wireless. In other embodiments, the control module 110 can be partly or wholly implemented in the robot 150.

The processor 114 can be a general purpose or special-purpose microprocessor configured to execute software or communicate with firmware modules contained in the memory 112 and accessible to the processor 114 to control various functions of the robot 150. The memory 112 can be any type of volatile or non-volatile memory, and in an embodiment, can include flash memory. The memory element 112 can be permanently installed in the control module 110, or can be a removable memory element, such as a removable memory card. In an exemplary embodiment, the memory 112 includes operating software 125. The operating software 125 may comprise software including processing routines, applications and or content configured to control the operation of the robotic system 100.

The input/output (I/O) element 118 can include, for example, a microphone, a keypad, a speaker, a pointing device, user interface control elements (i.e., a human-to-machine or man-machine interface), and any other devices or system that allow an operator to provide input commands and receive information from the control module 110. As illustrated in FIG. 1, the robot 150 may include an integrated operator interface, as indicated by broken line, for interacting with an operator. Alternatively, or additionally, the robot 150 may be in communication with an operator interface 153 over a communication link 165. Wherever located, the operator interface 153 will include sufficient mechanisms for providing robot status information which can include an indication of the manipulator presently coupled to the robot 150. The operator interface 153 will further include sufficient mechanisms for an operator to identify or otherwise select a task, provide feedback concerning performance of a task, override the selection of one of the available manipulators, etc.

In some arrangements, the input/output element 118 may receive various inputs at the robotic system 100 via infrared signals or radio-frequency signals sent from a remote device. For example, one or more sensors 136 may be communicatively coupled via infrared or radio-frequency signals in a communication link 160 to provide feedback while the robot 150 is performing an assigned task. The communication link 160 provides information that can be used by the robot 150 to complete the task. In addition, one or more signals from the sensor(s) 136 can be stored as a qualitative measure of the capability of the combination of the robot 150 and the manipulator-A to complete the assigned task. The one of more signals from the sensor(s) 136 may be recorded by the control module 110 at select times during task attempts. Although the sensor(s) 136 are shown removed from the robot 150 it should be understood that one or more sensors integral to the robot 150 and/or the manipulators may be used to send feedback signals to the control module 110. For example, one or more voltage and current sensors (not shown) may be arranged in circuits of the manipulator arm 156, the manipulator controller 154, and/or the base 152 to measure power consumed during a task attempt.

When a remote controller is communicating with the robotic system 100, the remote controller may include lamps, light-emitting diodes, displays or other feedback mechanisms for communicating information from the robotic system 100 to an operator of the remote controller. Such a remote controller will include one or more input mechanisms that enable an operator of the robot 150 to control the various functions of the robot 150, select a manipulator (including override an automatic selection of a manipulator, provide an indication of completed task, and or communicate a quality score based on an observed task performed by the robot 150.

The power module 126 may comprise any type of power source, such as an alternating current (AC) powered source, a direct current (DC) powered source, or any other power source. In an exemplary embodiment, the power module 126 may comprise a battery, which can be a single use battery, or a rechargeable battery. When the control module 110 is integrated in the robot 150, the control module 110 may be coupled to a power source within the robot 150.

In an exemplary embodiment, the robotic system 100 uses the selector engine 400 to dynamically select a particular manipulator (e.g., manipulator A, manipulator B, or manipulator C) from the set of available manipulators 158 for a present task to be performed. The selector engine 400 may be an application-specific integrated circuit (ASIC) or a read-only memory element programmed to perform the described functions. Alternatively, the memory 112 may include data and applications to both support the robot 150 and perform described functions. However, the control module 110 is enabled, a particular manipulator from the set of manipulators is identified as being better suited than the remaining manipulators to perform the task in accordance with results recorded from previous attempts using the robotic system 100 to complete the task. The recorded results originate from task attempts performed by the robot 150 or from other instances of similar robots 150 arranged with similar manipulators. An elapsed time and power required are recorded for each task attempt that is successfully completed. In some situations, a relative score of the quality of a completed task attempt and measurements of other parameters of interest may also be recorded with each task attempt. Manipulator selection can be adjusted in accordance with an operator preference or an express override.

Figure 2:
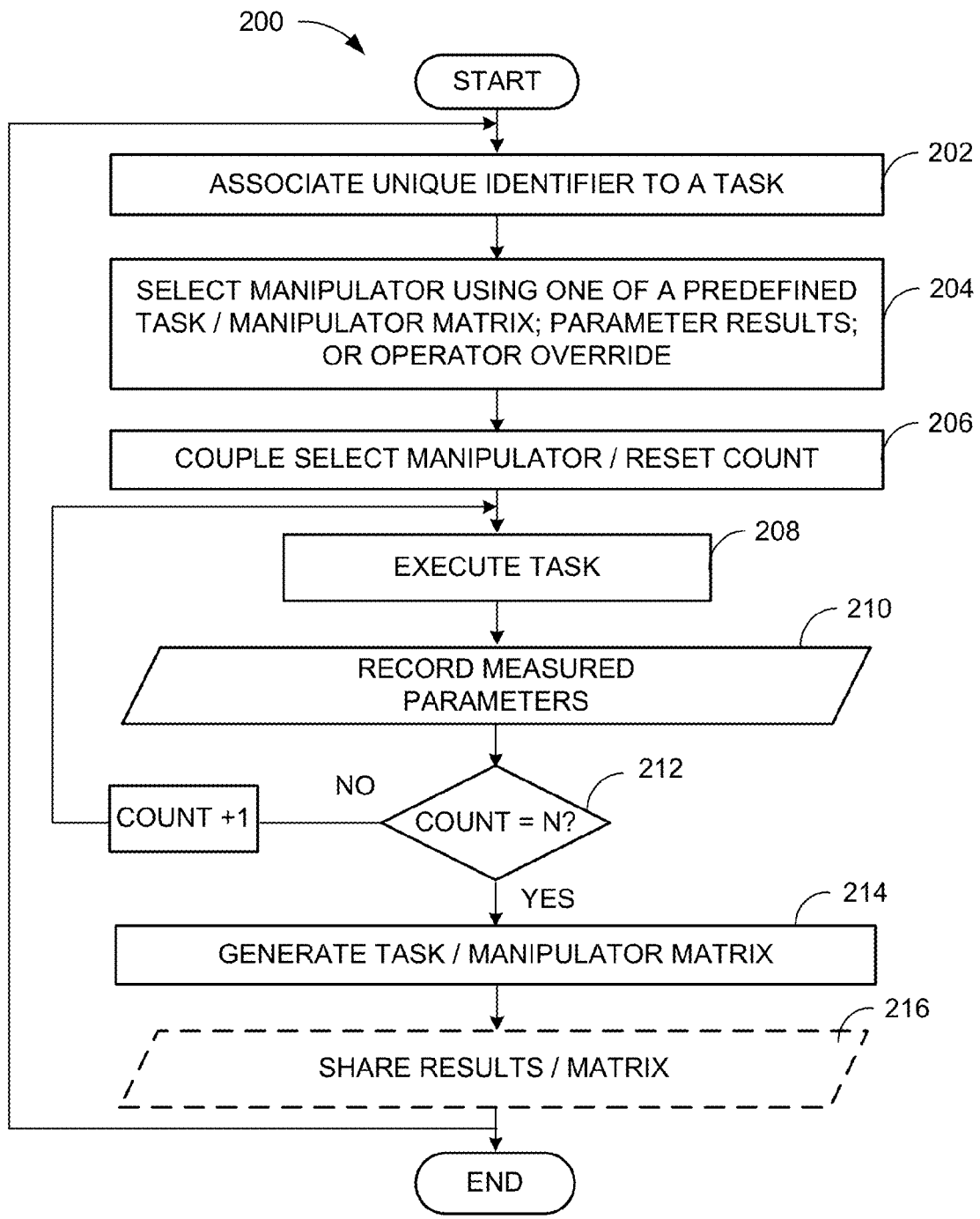
FIG. 2 is a flow diagram illustrating an example embodiment of a method for developing optimal relationships between defined tasks and manipulators within the robotic system of FIG. 1.

FIG. 2 is a flow diagram illustrating an example embodiment of a method 200 for developing optimal relationships between defined tasks and the interchangeable manipulators available to the robotic system 100 of FIG. 1. Once developed, the task/manipulator relationships can be used in static or pre-defined selection of a select manipulator from a set of available manipulators. The method begins with block 202 where a task is identified and associated with a unique identifier. A task will include the detailed instructions and logic that directs the robotic system 100 to perform a desired course of activities with a combination of the manipulator arm 156 and a select manipulator. In block 204, a manipulator is identified either using a predefined task/manipulator matrix (when one exists); parameter results when they exist; or in accordance with an operator override. In block 206, the select manipulator is coupled to the manipulator arm 156 of the robotic system 100 and a counter is reset. In conjunction with or in addition to the counter reset in block 206, the robotic system 100 may be further configured or initialized by resetting a timer and providing power to one or more meters or circuits arranged to collect measured results. In block 208, the robotic system 100 is used to execute the identified task. Upon task completion or the failure to complete the task successfully in a permitted time, the method 200 continues with block 210 where one or more measured parameters are recorded. The recorded parameters may include the power required to complete the task, the elapsed time to complete the task, etc.

In some embodiments, an operator or observer is prompted to enter a qualitative measure of the completed task. Results and qualitative scores from successfully completed tasks are recorded. Parameters associated with failed attempts need not be recorded.

In block 212, a query is performed to determine if a desired number of attempts have been completed. When the response to the query is negative, a counter is incremented and the functions identified in blocks 208 and 210 are repeated. Otherwise, when a desired number of task attempts have been completed and results recorded, the method continues with block 214 where a task/manipulator matrix is developed. Thereafter, as indicated by broken line the robotic system 100 or another computing device that can access the recorded results may optionally distribute or otherwise share the information and or the generated task manipulator matrix as indicated in block 216.

Figure 3:
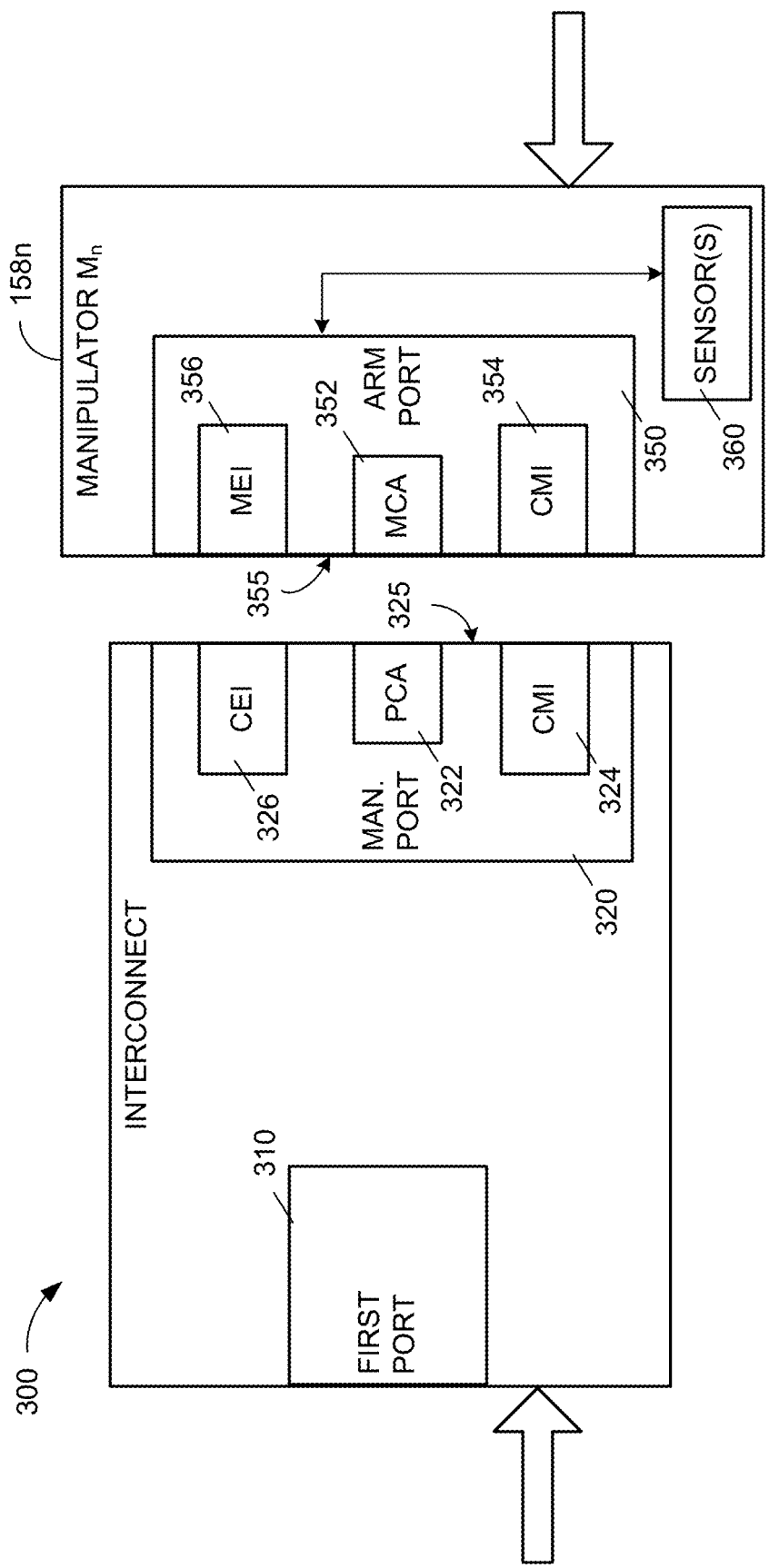
FIG. 3 is a schematic diagram illustrating an example embodiment of the interconnect of FIG. 1 in proximity to a manipulator.

FIG. 3 is a schematic diagram illustrating an example embodiment of the interconnect 300 of FIG. 1. The interconnect 300 is illustrated in proximity to an example manipulator 158n. As indicated in FIG. 3, the manipulator 158n includes an armature or arm port 350 arranged with features and elements that enable the manipulator 158n to be electrically and physically coupled to the manipulator arm 156. In this regard, the arm port 350 includes one or more manipulator connection alignment (MCA) features 352 arranged proximal to or along a mating surface 355 of the arm port 350. The one or more MCA features 352 may include one or more surfaces with a particular shape and dimensions such as a slot, opening or other physical depression or physical extension in registration with a corresponding pre-connection alignment (PCA) element(s) 322 arranged in a manipulator port 320 of the interconnect 300.

In a preferred embodiment, the PCA elements 322 comprise a set of magnets embedded in a housing, or proximal to, a mating surface 325 of the manipulator port 320. When this is the case, the MCA features 352 will comprise a respective set of magnets arranged in registration with the PCA elements 322. As external forces (illustrated by arrows) are applied in opposing directions to the interconnect 300 and the manipulator 158n, magnetic forces of attraction will guide the interconnect 300 and the manipulator 158n into a pre-alignment relationship which facilitates an operational coupling of conductors (not shown) in a manipulator electrical interface (MEI) 356 with corresponding electrical conductors (not shown) in a common electrical interface (CEI) 326 in the manipulator port 320 of the interconnect 300. The CEI 326 includes a common arrangement of power and signal conductors to provide power and communicate control signals to and receive feedback signals from the respective manipulators. The CEI 326 also uses a common protocol for communicating control signals to the respective manipulators. In addition, the pre-alignment relationship further facilitates a physical or mechanical coupling between elements or features of a manipulator mechanical interface (MMI) 354 with respective mating features or elements of a common mechanical interface (CMI) 324. Accordingly, the CMI 324 uses common mechanical features to mechanically secure the respective manipulators to the manipulator arm 156 via the interconnect 300. As indicated above, one having ordinary skill in the art will understand the construction and operation of a robotic system 100, and, as such, implementation details are omitted for brevity.

As further illustrated in FIG. 3, the manipulator 158*n* includes a sensor or sensors 360 in communication with the arm port 350 and more specifically the MEI 356. The sensor(s) 360 communicate signals that can be used by the robot 150 during the performance of a programmed task. The various signals are forwarded via the interconnect 300 and the manipulator arm 156 on their way to the manipulator controller 154. As described, one or more of the feedback signals are communicated to and recorded in the control module 110 or in a memory in communication with the robotic system 100 at select times during execution of a defined task as a qualitative measure of the ability of the combination of the robotic system 100 and the select manipulator 158*n* to perform a desired task.

Figure 4:
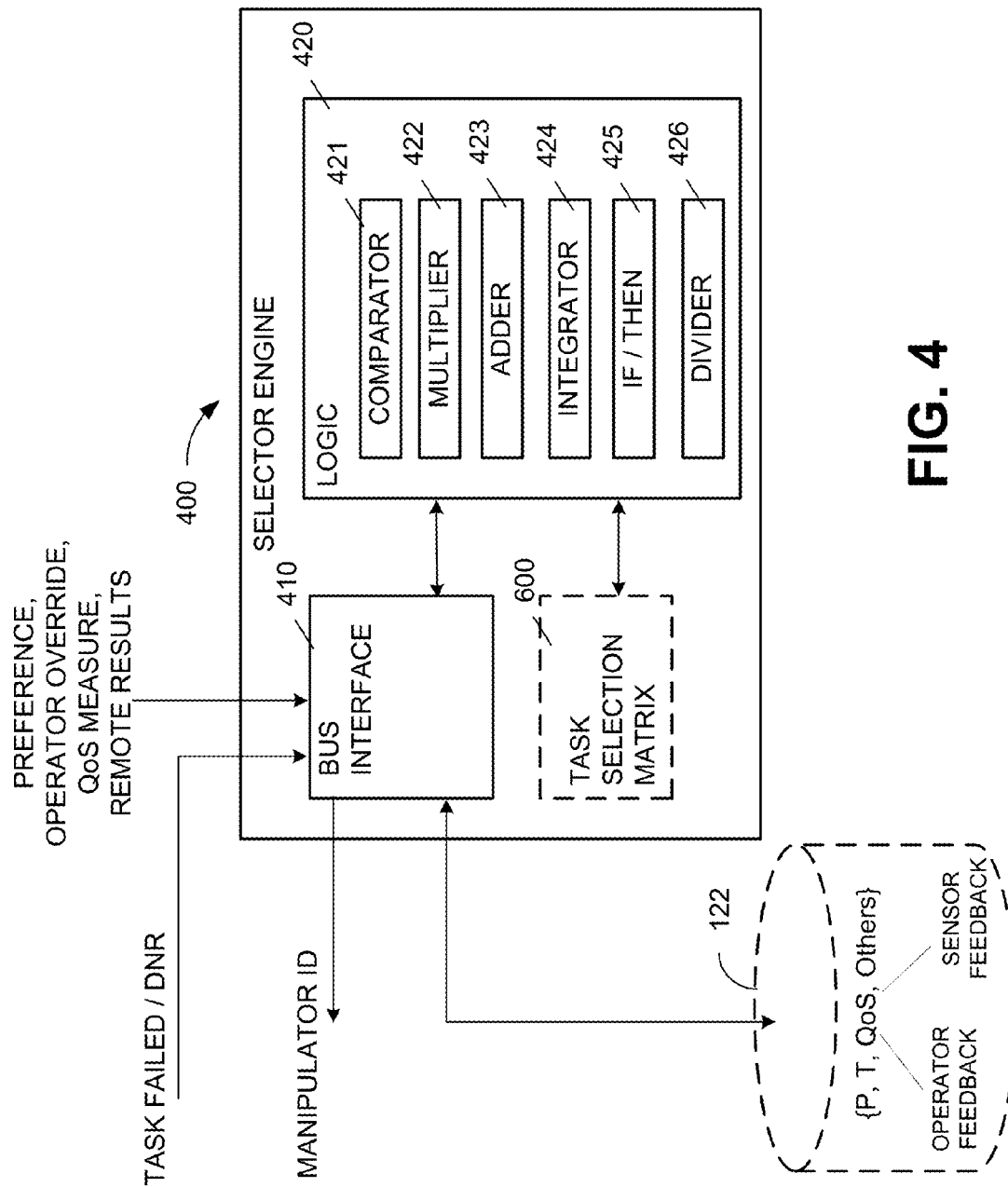
FIG. 4 is a block diagram illustrating an example embodiment of the selector engine of FIG. 1.

FIG. 4 is a block diagram illustrating an example embodiment of the selector engine 400 of FIG. 1. The selector engine 400 includes a bus interface 410 and logic 420. The bus interface 410 receives and forwards measured parameters (e.g., power, elapsed time, QoS, etc.) from the results store 122 to the logic 420. At select times, the bus interface 410 receives control signals indicative of one or more preferences, an operator override, a measure of QoS, and remote results. The control signals direct the logic 420 in determining a manipulator from the set of available manipulators. The logic 420 includes a comparator 421, a multiplier 422, an adder 423, an integrator 424, if/then branch processing logic 425, a divider 426, registers (not shown), and task selection matrix generation logic (not shown) to associate an optimal manipulator with one or more tasks programmed in the robotic system 100.

The generated associations between identified tasks and respective manipulators are stored in the task selection matrix 600, which may be implemented in one or more storage elements integrated with the selector engine 400 or in one or more storage elements external to the selector engine 400 but accessible to the logic 420. Whether the selector engine 400 identifies a manipulator from the task selection matrix 600, in accordance with an operator directed override, or after a comparison of one or more results generated from functions enabled in logic 420, the selector engine 400 communicates the manipulator identifier via the bus interface 410, which forwards the identifier to the robotic system 100. The robotic system 100 responds by automatically uncoupling a presently coupled manipulator and coupling the identified or select manipulator or providing an instruction for an operator to perform any necessary uncoupling of a manipulator before coupling the select manipulator.

The selector engine 400 provides a manipulator selection that is based on factors such as task-at-hand, energy efficiency, and available time. The selector engine 400 is also capable of developing a history of manipulator use for a particular task, and using the history for future manipulator selection. The history can be stored in the results database 122 and can be continually updated/expanded so that future manipulator selection can be based on a history of use, including, for example, success of task completion, efficiency of use of a particular manipulator for a task, etc.

The optimum selection matrix is optimized for power, time, and optionally QoS (Quality of Service), based on the measured parameters while performing a given task with different manipulators. As indicated in FIG. 4, QoS may have a component based on operator feedback and a separate component based on measures of accuracy provided by one or more sensor(s) 136 in communication with the control module 110 and/or one or more sensor(s) 360 arranged in a manipulator 158*n*. Operator feedback may be communicated via a man-machine interface (e.g., the operator interface 153) which may be integrated with or in communication with the robot 150. Operator feedback includes observations of the robotic system 100 performing a defined task with an identified manipulator from the set of manipulators 158. Sensor derived QoS feedback includes recorded measures captured upon completion of an intermediate step of a task at hand or upon the completion of the task at hand. These recorded measures provide an indication of the accuracy of the robot 150 when performing a task or portion of the task. A manipulator selection algorithm can use one or both types of QoS measures to identify a member from the set of available manipulators as being better suited for a defined task based on a results history developed from the measured parameters associated with task attempts. Such parameters may include one or more currents and voltages recorded at select intervals and averaged over the duration of the task.

For example, consider task-A performed using manipulator-A in the first instance and then using manipulator-B in the 2nd instance. The time elapsed for these two cases are t1 and t2, respectively. If the QoS for both the cases are the same then the manipulator associated with minimal energy consumption needs to be picked for subsequent usage to satisfy the condition of optimal manipulator selection.

Mathematically, in this case the manipulator associated with the minimum result from the following functions is identified as the optimal manipulator for the task at hand when optimized for power consumption.

$$\int_0^{t1} p1(t)dt = e1 = \text{Energy consumed with the use of manipulator ``A''}$$

$$\int_0^{t1} p2(t)dt = e2 = \text{Energy consumed with the use of manipulator ``B''}$$

Mathematically, in this case the manipulator associated with the minimum result from the following functions is identified as the optimal manipulator for the task at hand when optimized for power consumption. Thus, when e2<e1 then select manipulator-B. The energy consumed when using a select manipulator can be determined using the logic 420 and the various logic elements of the selector engine 400 including comparator 421, multiplier 422, integrator 424, and if/then branch logic 425.

When so desired, the inclusion of QoS in the manipulator selection algorithm is implemented with a factor and a multiplication operation. QoS values are real numbers in the range [0, 1], where, 0=failed and 1=most acceptable. The following example illustrates how a QoS value effects the manipulator selection. Consider task-L performed using manipulator-A in the first instance and then using manipulator-B in the $2^{nd}$ instance. Further, the time required to complete the task attempts are t1 and t2 respectively. Let us say that the QoS for these two cases are q1 and q2 respectively. Then, the manipulator associated with minimal energy consumption cannot be picked directly. The weighted energy is given as:

$$e_{weighted} = e_{raw} * (1/q)$$

Mathematically, in this case the manipulator associated with the minimum result from the following functions is identified as the optimal manipulator for the task at hand.

$$\left(\frac{1}{q1}\right) \int_0^{t1} p1(t)dt =$$

$e1 =$ Weighted energy with the use of manipulator $"A"$ $$\left(\frac{1}{q2}\right) \int_0^{t1} p2(t)dt =$$

$e2 =$ Weighted energy with the use of manipulator $"B"$

The manipulator associated with the minimum result from the above functions is identified as the optimal manipulator for the task at hand when optimized for power consumption and QoS. Thus, when e1<e2 then select manipulator-A. The energy consumed when using a select manipulator can be determined using the logic 420 and the various logic elements of the selector engine 400 including comparator 421, multiplier 422, integrator 424, if/then branch logic 425 and divider 426.

It should be noted that with q=0 (i.e., a complete failure), the weighted energy approaches infinity and hence the associated manipulator would not get picked in for handling the same task in the future. Accordingly, a task failed input signal received at the bus interface 410 of the selector engine 400 indicates a do not record (DNR) condition and parameters measured during such a failed task attempt need not be permanently recorded in the task attempt history. Under such circumstances, a date, time, manipulator identifier and a task attempt identifier may be associated with a flag or other indicia of a failure of the robot 150 to complete the task.

The manipulator selection algorithm includes the capability to detect some predefined command-phrases, correlate them with past performance timing and make the manipulator selection based on "timing-prioritization" as indicated by the command-phrase. This is illustrated in the following example.

Consider task-L performed using manipulator-A in the first instance and then using manipulator-B in the $2^{nd}$ instance. Further, the time required to complete the separate task attempts are t1 and t2, respectively with energy consumption of e1 and e2, respectively. Let us also say that e1, e2 and t1, t2 have the following relationship: e1>e2 and t1<t2. In this case, an energy optimized selection approach (as explained earlier) would have made the selection of manipulator "B" since its use requires minimum energy. However, if the user in this case issues a command like— "perform the task ASAP", the keyword ASAP in the command-phrase is taken as a clue to make the manipulator selection based on task operation timing as a preference, leading to the selection of manipulator "A", even if it is associated with higher energy consumption. Thus, the timing preference-based manipulator selection criterion overrides the energy consumption based selection choice.

Figure 5:
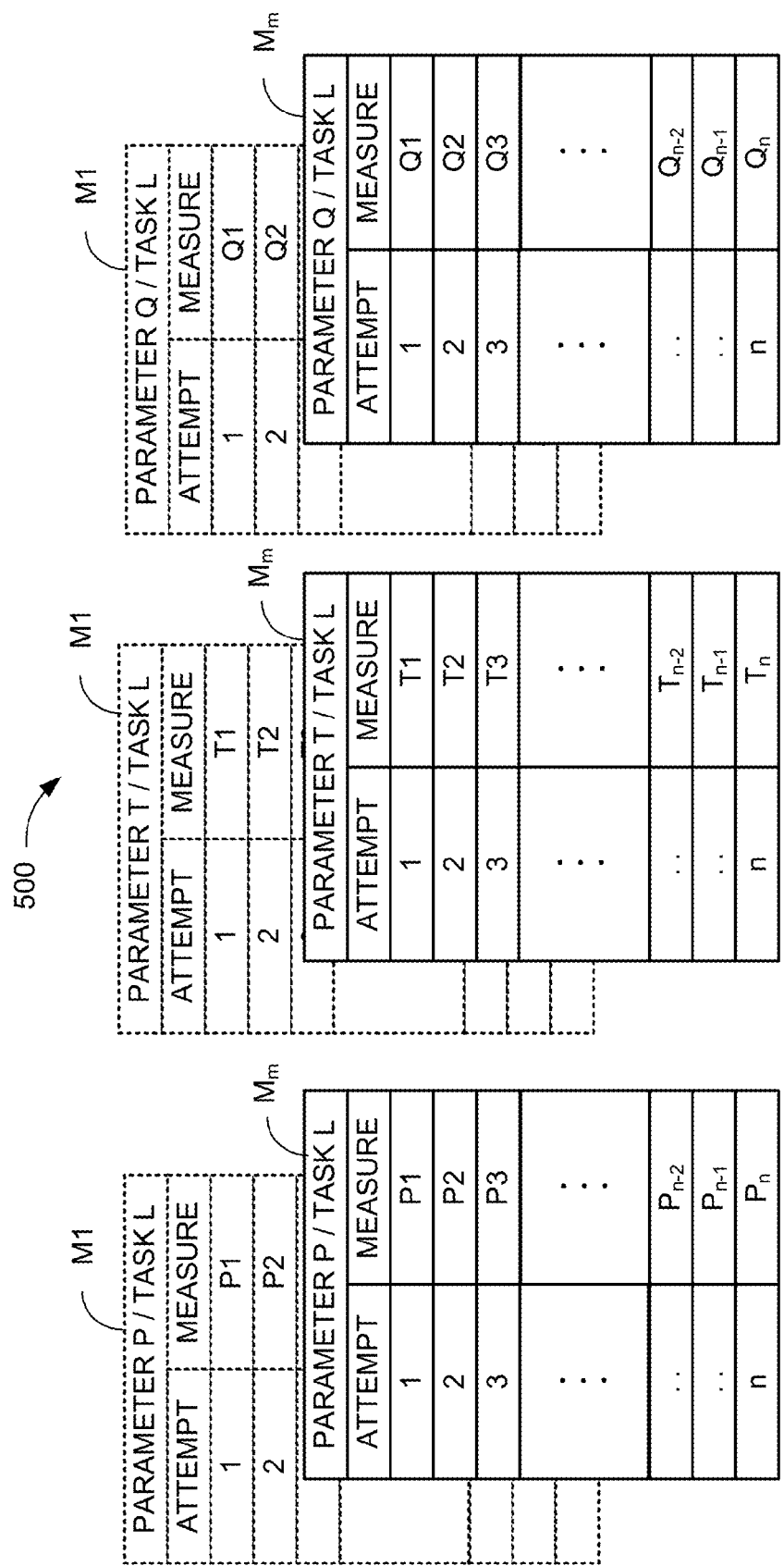
FIG. 5 is a schematic diagram illustrating an example embodiment of a table suitable for recording test results.

FIG. 5 is a schematic diagram illustrating an example embodiment of stored data relationships in the format of a table 500 suitable for recording test results. For example, for a defined task L a respective measure of power required (P), time elapsed (T), and a quality of the completed task (Q) may be recorded for each of N attempts, where N is an integer. Results may be recorded for tasks completed in a manner deemed acceptable by an operator or other observer of the task attempt. Results are recorded in this manner for any number of defined tasks L, where L is an integer that can be performed with M manipulators, where M is an integer greater than or equal to two. While the illustrated embodiment records respective measures for power, time and quality, additional parameters of interest may also be recorded in association with each attempt, as may be desired.

Figure 6:
FIG. 6 is a schematic diagram illustrating an example embodiment of a task selection matrix.

FIG. 6 is a schematic diagram illustrating an example embodiment of a task selection matrix 600 derived from the information recorded in the task/manipulator/attempt data relationships illustrated and described in association with FIG. 5. Various formulas stored or otherwise enabled by the selector engine 400 or stored in the operating software 125 or other portions of the memory 112 of the control module 110, when accessed and executed by the processor 114, may identify which of the available manipulators is best suited or optimal for completing a defined task under certain preferences.

Preferences will identify a tradeoff between the measured parameters. For example, an operator may desire to achieve the highest quality achievable by the robotic system 100 when performing a particular task at the expense of both power and time. Another task may not require such a high standard for quality and for this separate task, the operator may elect a preference to use the most efficient manipulator based on the required power to complete the task at the expense of quality or both quality and time. By way of further example, when the robotic system 100 is operating solely on battery power, an expected or measured value of the remaining storage capacity may be applied as an input in a manipulator selection function.

As indicated in the illustrated task manipulator matrix 600, a manipulator M1 is identified as being best-suited for the tasks identified by labels L1, L7, L9, as well as other tasks for the corresponding preferences (not shown) indicated by an operator of the robotic system. Manipulator M2 is identified as best-suited for use to complete tasks identified by labels L2, L4, L8, as well as other tasks for corresponding preferences indicated by an operator. Manipulator M3 is identified as best-suited for use to complete tasks identified by labels L3, L5, L6, as well as other tasks for corresponding preferences communicated by an operator. Manipulator Mm is identified as best-suited for use to complete tasks identified by labels L10, L11, L12, as well as other tasks.

Figure 7:
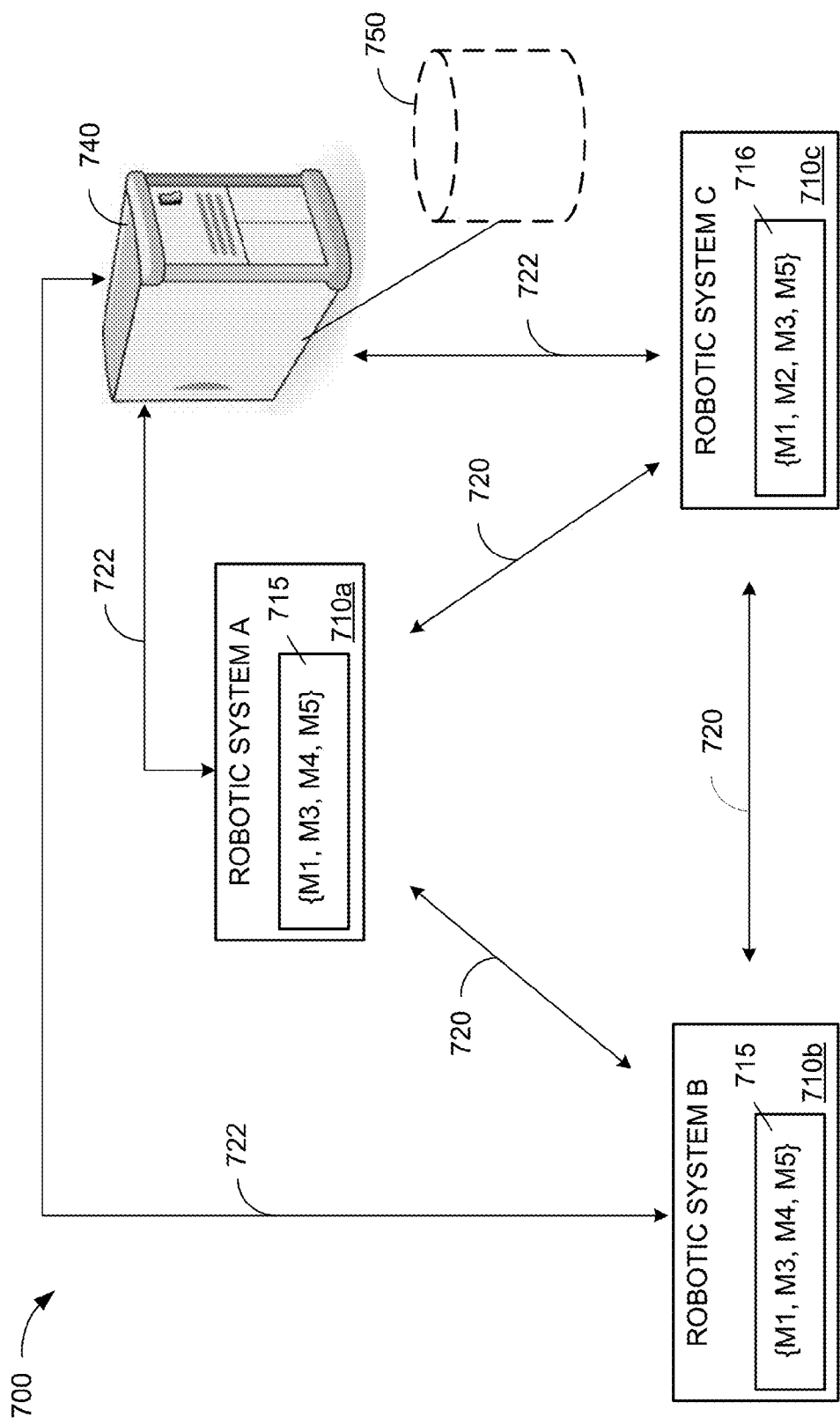
FIG. 7 is a schematic diagram illustrating an example embodiment of a collaborative environment of robotic systems such as the robotic system of FIG. 1.

FIG. 7 is a schematic diagram illustrating an example embodiment of a collaborative environment 700 of robotic systems 710a-710c. While the illustrated collaborative environment includes three similarly configured robotic systems, such collaborative environments of robotic systems may be as small as two in number or may include as many in number as may be desired. As illustrated, each robotic system 710 includes a respective set of manipulators. For example, robotic system 710a and robotic system 710b each include a set of manipulators 715. The set of manipulators 715 includes members M1, M3, M4 and M5. Robotic system 710c includes a set of manipulators 716. The set of manipulators 716 includes members M1, M2, M3 and M5, the members of which intersect with the members in the set of manipulators 715.

As further indicated in FIG. 7, the respective robotic systems can be selectively coupled via communication links 720 to share information such as local results for defined task attempts performed with manipulators M1, M3 and M5, which are found in each of the respective sets of manipulators. Results associated with task attempts performed using manipulator M2 with robotic system 710c may be withheld from communication sessions with robotic system 710a and robotic system 710b. Sets of available manipulators and individual members (manipulators) may be identified by a unique label, unique combinations of labels or other identifiers. However identified, the various robotic systems 710a-710c communicate historical parametric results such as the information in the example tables presented and described in association with FIG. 5.

As also shown in FIG. 7, a usage profile information unit 740 in communication with a data store 750 may be provided to accelerate the collection and transfer of historical results or the development of task/manipulator selection matrices. The usage profile information unit 740 may include operating software arranged to provide an enhanced or improved manipulator selection for identified tasks. In addition, the usage profile information unit 740 may be communicatively coupled to a dedicated robotic system (e.g., a select instance of the robotic systems 710a-710c) to perform local simulations or actual trials. When this is the case, information may be shared with the remaining robotic systems 710 wherever deployed once a sufficient results history has been recorded and or a task/manipulator matrix has been developed. Essentially, the usage profile information unit 740 augments and/or accelerates the approach of robot-to-robot interaction based algorithm evolution.

For example, the manipulator selection decision(s) may be made in response to information regarding components of a select manipulator design that is not otherwise available to the separate instances of the robotic systems 710. This information could include knowledge regarding the historical performance of one or more control system components used in the manufacture of a set of manipulator controllers 158 or knowledge concerning manufacturing techniques of a particular vendor of components used in a set of robots 150 manufactured by a particular provider, etc.

The respective robotic systems 710a-710c can be selectively coupled via communication links 722 to share information with the usage profile information unit 740. As described, the usage profile information unit 740 will communicate with one or more of the respective robotic systems 710a-710c to provide task/manipulator selection matrices, historical information from other similarly configured robotic systems, and/or notices of new manipulators or adjustments to deployed manipulators to achieve desired performance and accuracy.

The connections 720, 722 can be any wired, wireless, optical, or any other bi-directional high-speed, medium speed or low-speed communication links, as known in the art. In addition, one or more of the connections may include multiple segments with each segment comprising wired, wireless, optical, or other bi-directional communication links or protocols. As an example, the connections 720, 722 can be implemented using extensible markup language (XML) over a hypertext transfer protocol (HTTP) connection. Alternatively, one or more of the connections 720, 722 can be implemented using a standard communication protocol as known in the communication arts or a proprietary communication protocol.

In an extension or as an alternative to the distributed collaborative environment 700, a data store or database 750 may be communicatively coupled over a publically accessible network such as the Internet to store information from one or more of the robotic systems 710a-710c. The information stored may include the results from each of the task attempts recorded from each of the robotic systems as presented and described in the tables of FIG. 5, one or more versions of task manipulator matrixes as presented and described in association with FIG. 6, as well as information regarding the various manipulators and robotic systems, as may be desired. Accordingly, the various robotic systems 710a-710c can be adapted to take advantage of both locally-generated information from power, time, QoS (including operator observed and entered measures as well as qualitative measures from sensor(s) in communication with a control module) and perhaps additional measurements collected from task attempts performed on a respective system, as well as collected results and derived manipulator recommendations based on information received from similarly configured robotic systems or a common data store 750. The robotic systems 710a-710c can be adapted to use static information identifying optimal manipulators based on a select number of local task attempts. Alternatively, the robotic systems 710a-710c can remain dynamic and responsive to results recorded both locally and/or remotely on similarly configured robotic systems 710a-710c.

Figure 8:
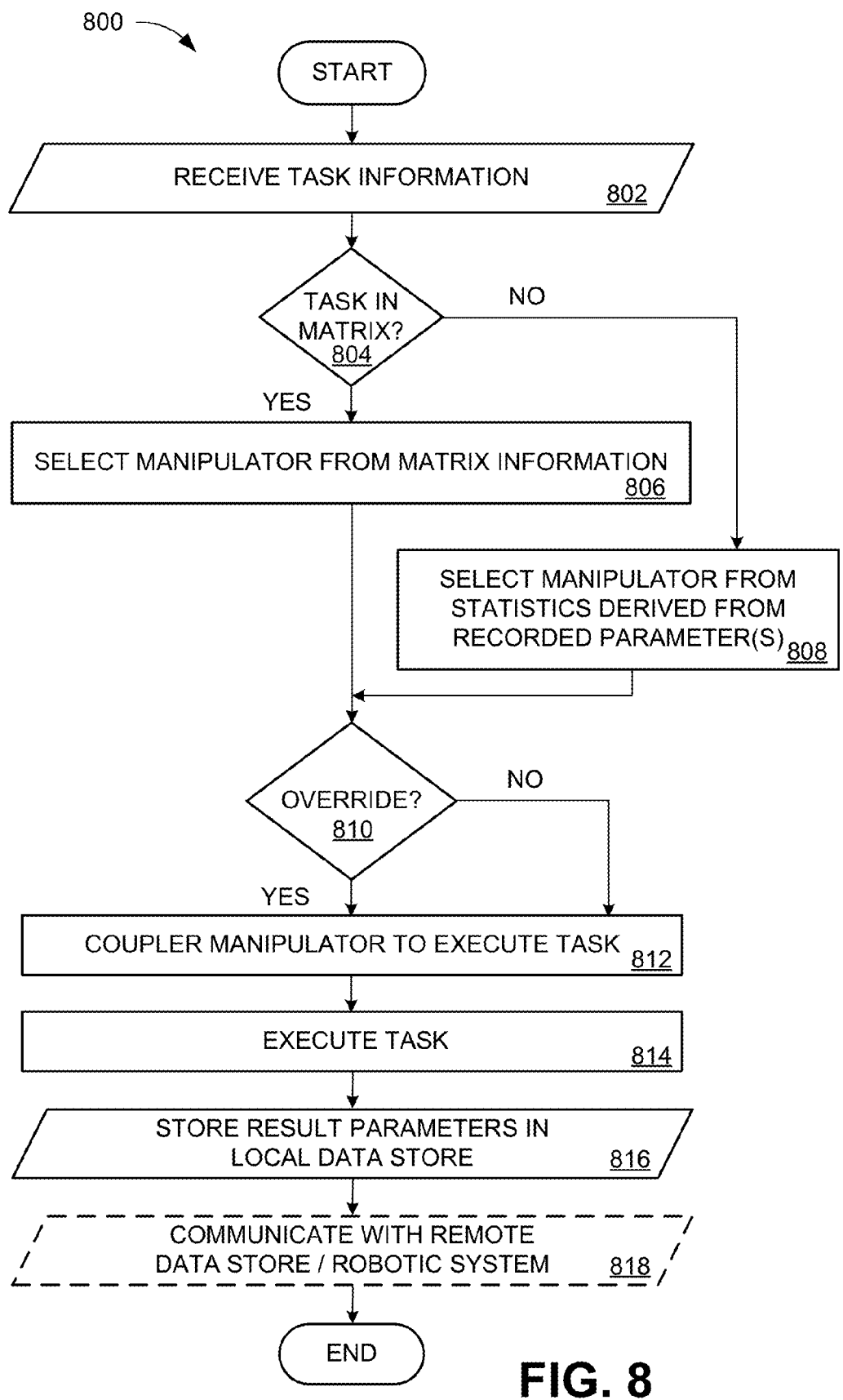
FIG. 8 is a flow diagram illustrating an example embodiment of a method for developing the results table of FIG. 5.

FIG. 8 is a flow diagram illustrating an example embodiment of a method 800 for developing the results tables of FIG. 5. The method 800 begins with block 802 where the robotic system 100 receives information identifying a task to be performed. In decision block 804, a task matrix is queried to determine if the identified task is found in the task selection matrix 600. When the identified task is already found in the task selection matrix 600, as indicated by the flow control arrow, labeled "Yes" exiting decision block 804, the selector engine 400 uses the information in the matrix to identify a select manipulator, as indicated in block 806, before proceeding to decision block 810 where a determination is made as to whether an operator has entered an override instruction identifying a different manipulator to be used in a task attempt. When the identified task is not found in the task selection matrix 600, as indicated by the flow control arrow labeled "No" exiting decision block 804, the selector engine 400 uses statistics derived from recorded parameters, as indicated in block 808, or a list in combination with a desired number of task attempts to identify a select a manipulator from the set of available manipulators. Whether the manipulator has been identified or selected by the operator, identified by the task selection matrix 600, or in accordance with a list of available manipulators and a desired number of task attempts, the robotic system 100 continues by coupling or directing an operator to couple the identified manipulator to the interconnect 300 of the manipulator arm 156 as indicated in block 812. Thereafter, in block 814 the task is performed. As indicated in input/output block 816, the robotic system 100 stores results measured or recorded during the task attempt in a local data store. Thereafter, at designated times the robotic system 100 optionally shares the recorded results with one or more similar remote robotic systems that share at least some of the same manipulators in the respective sets of available manipulators.

Figure 9:
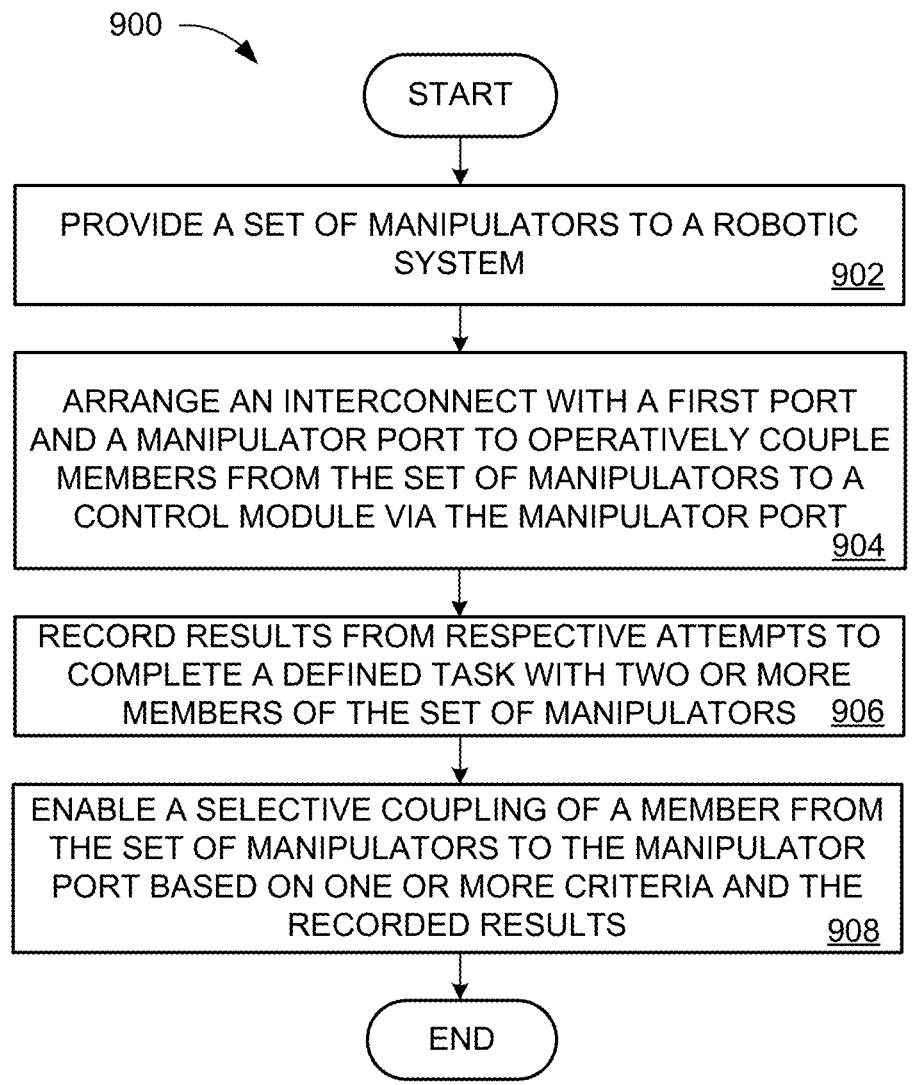
FIG. 9 is a flow diagram illustrating an example embodiment of a method for identifying an optimal manipulator for a robotic system.

FIG. 9 is a flow diagram illustrating an example embodiment of a method 900 for identifying an optimal manipulator for the robotic system 100. The method 900 begins with block 902 where a set of manipulators are provided to a robotic system 100. In block 904, an interconnect with a first port and a manipulator port is arranged to operatively couple members from the set of manipulators to a control module 110 via the manipulator port. In block 906, results are recorded from respective attempts to perform a defined task with two or more members from the set of available manipulators. In block 908, a selective coupling of a member from the set of manipulators to the manipulator port is enabled in accordance with one or more criteria and the recorded results. As described, the selection can be made in response to a task selection matrix developed from local results, results received from other similarly configured robotic systems or results from both a local robotic system 100 and results from the other systems. In one arrangement, the task selection matrix will define a particular manipulator as the optimal manipulator for completing a defined task. In alternative arrangements, the task selection matrix may include one or more of a task to be completed, an operator preference, a desired quality of service or other factors that together identify an optimal manipulator to achieve the desired task.

The system and method for dynamic robot manipulator selection described herein may be implemented on one or more ICs, analog ICs, RFICs, mixed-signal ICs, ASICs, printed circuit boards (PCBs), electronic devices, etc. The system and method for dynamic robot manipulator selection may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the system and method for dynamic robot manipulator selection described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A robotic system, comprising:
a set of manipulators;
an interconnect with a first port and a manipulator port, the interconnect arranged to enable a selective coupling of a member of the set manipulators to the manipulator port; and
a control module having an interface, the control module operatively coupled to the member of the set of manipulators through the interface and the manipulator port, the control module including a selector engine responsive to parameters recorded while performing a task with members from the set of manipulators, where the parameters are configured to allow the control module to determine energy efficiency when performing the task with the member of the set of manipulators.

2. The robotic system of claim 1, wherein the parameters include power and time expended in performing the task.

3. The robotic system of claim 1, wherein the parameters include feedback from a sensor arranged to provide a signal responsive to manipulator performance.

4. The robotic system of claim 1, wherein the control module is arranged to record a measure of task success received over a man-machine interface.

5. The robotic system of claim 4, wherein for a first instance of a task attempt using a first member of the set manipulators and for a second instance of the task attempt using a second member of the set of manipulators that each result in the same measure of task success, a function of power and time is used to determine an optimal manipulator from the first manipulator and the second manipulator.

6. The robotic system of claim 5, wherein the optimal manipulator is identified based on relative energy consumption.

7. The robotic system of claim 4, wherein for an instance of a task attempt using a first member of the set manipulators and for a separate instance of the task attempt using a second member of the set of manipulators where the task attempts result in a different measure of task success, a weighted function of power and time is used to determine an optimal manipulator from the first manipulator and the second manipulator.

8. The robotic system of claim 1, further including a communication interface for receiving a measure of quality of service.

9. The robotic system of claim 1, further including a communication interface that receives a notice from usage profile information unit programmed to generate the notice when an identified manipulator not presently in the set of manipulators exceeds a measure of performance achievable with the robotic system.

10. The robotic system of claim 1, further including a communication interface for sharing results with remote robotic systems.

11. The robotic system of claim 10, wherein the results are processed in a usage profile information unit that receives one of a selection matrix and task attempt results.

12. The robotic system of claim 1, further including a communication interface that receives an override signal.

13. The robotic system of claim 1, wherein the selector engine is responsive to a selection input.

14. The robotic system of claim 1, wherein the set of manipulators are arranged with a common mechanical interface.

15. The robotic system of claim 1, wherein the set of manipulators are arranged with a common electrical interface.

16. The robotic system of claim 1, wherein the set of manipulators are arranged with a set of magnets to facilitate a pre-connection alignment with the manipulator port.

17. The robotic system of claim 1, wherein the control module includes a processor, a memory and a power supply coupled to each other via a bus, the memory including data and instructions executed used by the processor to maintain a manipulator task success history to be used in subsequent manipulator selection.

18. A method, comprising:
providing a set of manipulators;
arranging an interconnect with a first port and a manipulator port to operatively couple members from the set of manipulators to a control module via the manipulator port; and
enabling a selective coupling of a member from the set of manipulators to the manipulator port, the selective coupling responsive to recorded results from respective attempts to complete a defined task using the member from the set of manipulators when coupled to a control system, where recorded results include energy efficiency when performing the defined task with the member of the set of manipulators.

19. The method of claim 18, wherein providing a set of manipulators and arranging an interconnect includes using a common electrical and mechanical interfaces in the manipulator port.

20. The method of claim 18, wherein enabling a selective coupling includes providing respective sets of magnets spatially arranged in registration and in opposed surfaces in the manipulator port.

21. The method of claim 18, wherein recorded results includes measured parameters associated with each respective attempt to complete the defined task, the measured parameters selected from the group including power consumed, elapsed time, and relative success in performing the defined task.

22. The method of claim 21, wherein relative success in performing the defined task is responsive to information communicated from a sensor.

23. The method of claim 21, wherein relative success in performing the defined task is communicated via a man-machine interface.

24. The method of claim 18, wherein the selective coupling is further responsive to an override input.

25. The method of claim 18, wherein the selective coupling is further responsive to results received via a communication interface from one or more instances of electro-mechanical machines that share a subset of the set of manipulators.

26. The method of claim 18, wherein the selective coupling is further responsive to results received via a communication interface from one or more instances of a usage profile information unit that collects and shares results from remote robotic systems.

27. The method of claim 26, wherein the usage profile information unit generates a notice when an identified manipulator not presently in the set of manipulators exceeds a measure of performance achievable with the robotic system.

28. The method of claim 18, further comprising:
receiving a notice via a communication interface from one or more instances of a usage profile information unit, the notice identifying a new manipulator to a market.

* * * * *